INVENTORS
Irving B. Lowen &
Marvin S. Maxwell

BY

ATTORNEYS

INVENTORS
Irving B. Lowen &
Marvin S. Maxwell
BY Earl Levy
ATTORNEYS

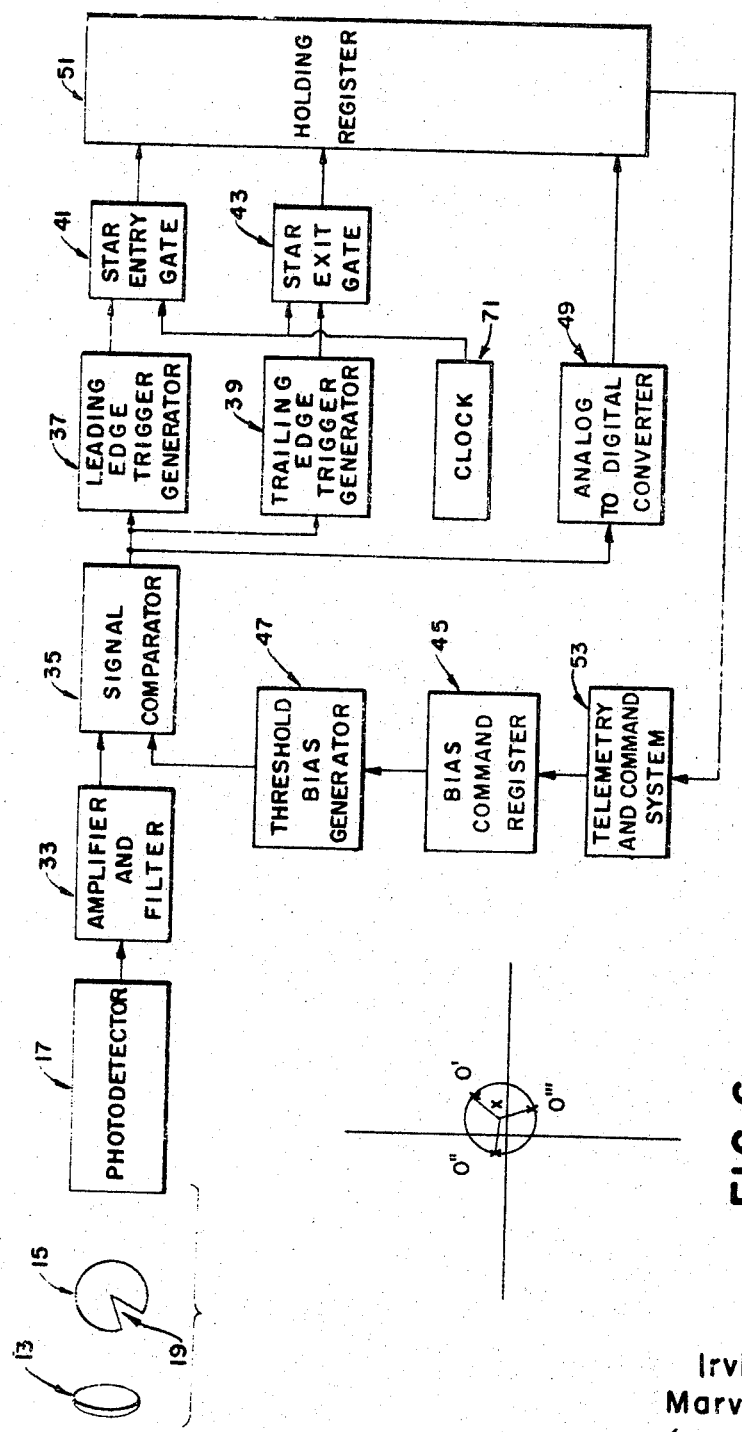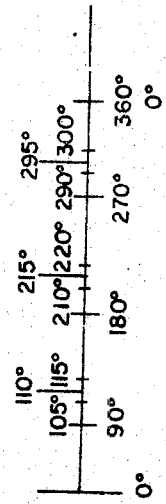

United States Patent Office 3,488,504
Patented Jan. 6, 1970

3,488,504
SPACECRAFT ATTITUDE DETECTION SYSTEM BY STELLAR REFERENCE
Irving B. Lowen, Bowie, and Marvin S. Maxwell, Silver Spring, Md., assignors to the United States of America as represented by the Administrator of the National Aeronautics and Space Administration
Filed Oct. 21, 1966, Ser. No. 588,635
Int. Cl. G01j 1/20
U.S. Cl. 250—203                    10 Claims

ABSTRACT OF THE DISCLOSURE

There is disclosed apparatus for determining the attitude of a spacecraft. In one embodiment, adapted for a three-axis control spacecraft, a reticle is mounted for constant rotation and a photo-detector generates a signal for each star detected through the reticle. Signal processing circuits determine if the star is of acceptable magnitude then, generate appropriate signals indicative of star intensity and azimuth. In another embodiment, for use in a spin stabilized vehicle, the reticle is fixed, depending on vehicle rotation for its rotation. The spacecraft clock replaces the shaft-encoder to provide azimuth information. This information is used to determine the spacecraft attitude by equating the measurements with the known star background.

---

The invention described herein was made by employees of the United States Government and may be manufactured and used by or for the Government for governmental purposes without the payment of any royalties thereon or therefor.

This invention relates to a space vehicle attitude detection system and more particularly to a system for determining the pitch, roll, and yaw attitude of a space vehicle. In addition, the invention relates to a system for determining the nutation or precession and the spin rate of a space vehicle.

It is essential to the successful operation of many space vehicles to know their orientation or attitude when in space. This may be necessary so that meaningful data reduction can be made of data obtained from instrumentation located on the vehicle. For example, if the vehicle is utilizing a boom mounted magnetometer to measure magnetic field intensity, it is necessary to know the direction in which the magnetometer boom is pointing to give meaning to the measurements being made. In other situations, it may be necessary to know the attitude of a space vehicle so that its attitude can be changed. For example, if a telescope for making stellar observations is mounted on the vehicle it may be necessary to change the orientation of the telescope's principal axis to a different orientation so that observations of other stellar objects can be made. Hence, it is essential to know the attitude of a space vehicle when it is being operated in space.

Normally, the overall attitude of a space vehicle is expressed in terms of its yaw, roll, and pitch attitudes. These terms relate to the three principal axes of the vehicle and determine its exact attitude with respect to a known reference system.

In addition to knowing a space vehicle's attitude, in many situations it is desirable to know its nutation or precession and its spin period. Nutation or precession refers to the movement of the vehicle about a spin axis and spin period refers to the time it takes for the vehicle to rotate through 360 degrees around a spin axis. This information is necessary so that the vehicle attitude control system can be used to control or eliminate undesirable nutations or spins.

The prior art has utilized various systems for sensing space vehicle movements and for determining from the sensed data the attitude of the vehicle. These systems normally include the use of one or more of the following sensing devices: horizon sensors to sense the earth's horizon; solar sensors to sense the location of the sun; and star sensors to sense the location of a particular star or star configuration.

The output signals from these electronic and electro-optical sensing devices have been transmitted to earth where they have been interpreted by suitable system to determine the attitude of the space vehicle. While these systems have found widespread use, they have not proven to be entirely satisfactory in all situations. Specifically, the systems are bulky and normally complicated. That is, their successful use depends upon observations taken from independent points on the space vehicle. Hence, these systems require the use of several sensors and electronic means to place the sensor signals in suitable form for transmission to earth. In addition, these devices are rather inaccurate for extremely precise space vehicle attitude determination.

Therefore, it is an object of this invention to provide a new and improved space vehicle attitude detection system.

It is also an object of this invention to provide a new and improved detection system that detects information which, when suitably analyzed, determines the pitch, roll and yaw attitude of a space vehicle.

It is a further object of this invention to provide a new and improved detection system that generates information which, when suitably analyzed, determines the nutation and spin period, as well as the pitch, roll and yaw of a space vehicle.

It is a still further object of this invention to provide a new and improved attitude detection system that is electronically, optically, and mechanically simple and uncomplicated.

It is still another object of this invention to provide a simple and uncomplicated system for displaying the attitude of a space vehicle.

In accordance with a principle of the invention, a single scanning instrument is mounted on the space vehicle and pointed in a predetermined direction with respect to the vehicle. The scanning instrument is adapted to scan a field of view. The field of view is determined by the direction in which the instrument is pointed. The scanning instrument includes suitable means to detect the presence of stars in the part of its field of view being scanned and to generate electronic signals indicating the presence of such stars. Further, a signal means is coupled to the scanning instrument and generates signals indicating what part of the scanning instrument's field of view is being scanned during any particular period. Electronic means are connected both to the scanning instrument and to the signal means to detect their output signals and to generate a composite output signal representing the presence and location of stars in the scanning instrument's field of view.

Since any particular star field is unique for a particular attitude of the space vehicle, the output from the electronic means is an electronic signal representing the space vehicle's attitude. This electronic signal can be interpreted in a suitably programmed computer to determine the resultant attitude of the space vehicle. Or, in accordance with a further principle of the invention, this electronic signal can be interpreted with the aid of a star map globe and a cap-shaped cursor arrangement to provide an observable display of the orientation of the space vehicle. The display may be either ground based or carried aboard the space vehicle.

It will be appreciated that the foregoing description has described a simple apparatus for determining the attitude of a space vehicle. By appropriate interpretation of the output signal from an electronic means, where the signal represents the location and presence of stars in a star field, the attitude of a space vehicle can be determined. Moreover, a further appropriate interpretation of this signal determines the nutation and spin period of the space vehicle. This simple apparatus depends upon the simple fact that for a fixed scanning instrument any star field in its field of view uniquely determines the attitude of the instrument and, hence, its attached space vehicle. That is, the star field is unique to each roll, pitch and yaw attitude of the space vehicle. The star field information can be used to determine the exact orientation or attitude of the vehicle and, further, it can be used to determine nutation and spin period of the vehicle.

The foregoing objects and many of the attendant advantages of this invention will become more readily appreciated as the same become better understood by reference to the following detailed description when taken in conjunction with the accompanying drawings wherein:

FIG. 3 is a line graph illustrating the output from the scanning instrument for one complete cycle of revolution of the scanning instrument's reticle;

FIG. 6 is a chart of various attitude detections and is used for determining the precession or nutation of the space vehicle; and FIG. 7 is a block diagram of a second embodiment of the invention that is suitable for use on a spin stabilized space vehicle.

Figure 1:
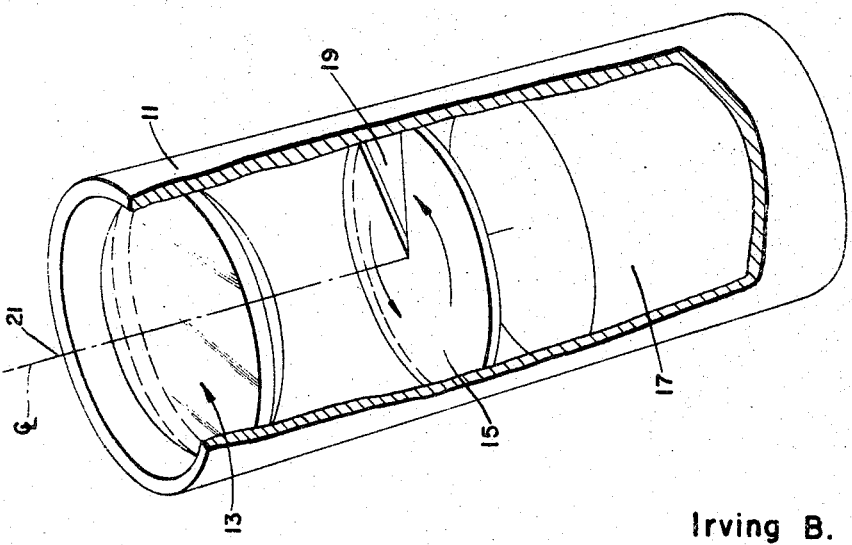
FIG. 1 is a diagram, partially in section, illustrating a scanner suitable for use with the invention.

Turning now to the drawings, wherein like reference numerals designate like parts throughout the several views, FIG. 1 illustrates the scanning instrument of the invention and comprises a tubular housing 11, a lens 13, a reticle 15, and a photodetector 17. The reticle 15 is opaque except for a transparent wedge-shaped slit 19.

The lens 13, the reticle 15, and the photodetector 17 are all spaced along the longitudinal axis 21 of the tubular housing 11. The photodetector 17 is mounted on one side of the reticle 15 and the lens 13 is located on the other side of the reticle 15. The photodetector is mounted so that light passing through the lens and the reticle wedge-shaped slit impinges on its photosensitive surface. The reticle 15 is adapted to be revolved, as hereinafter described, so that its slit 19 scans the field of view observed by the lens 13. Hence, each star that is in this field of view provides light that impinges on the photosensitive surface of the photodetector 17 as the slit passes through the portion of the lens' field of view in which the star is located.

Figures 2, 4:
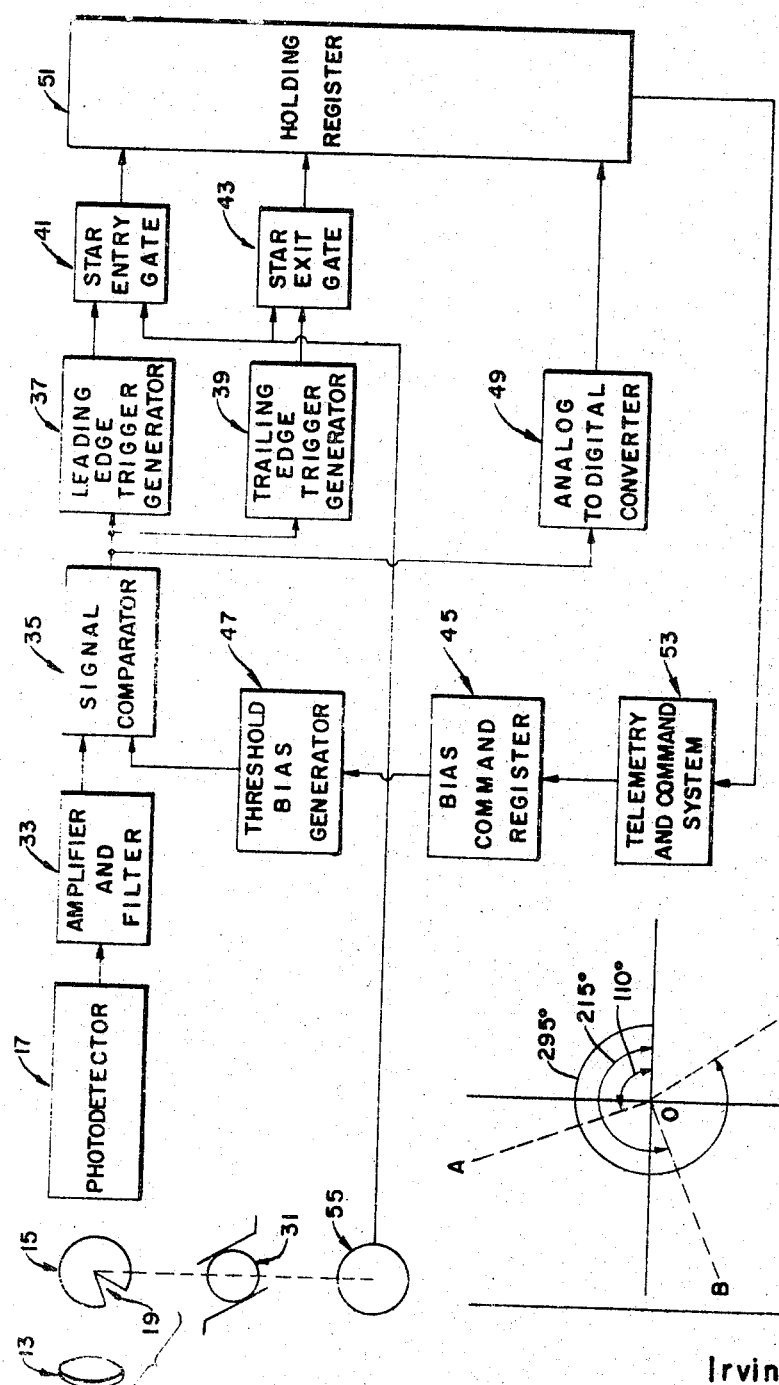
FIG. 2 is a block diagram of one embodiment of the invention that is suitable for use with an earth stabilized space vehicle.
FIG. 4 is a coordinate system for the line graph illustrated in FIG. 3.

FIG. 2 illustrates in block diagram for a system for electronically manipulating the information generated by the photodetector prior to its transmission to earth. Also, schematically illustrated in FIG. 2 is the lens 13, the reticle 15 with its slit 19, and the photodetector 17. Further, a motor 31 is schematically illustrated as connected to the reticle 15 for rotating the reticle so that it can scan the field of view.

The electronic system illustrated in FIG. 2 comprises an amplifier and filter 33, a signal comparator 35, a leading edge trigger generator 37, a trailing edge trigger generator 39, a two-input star entry gate 41, a two-input star exit gate 43, a bias command register 45, a threshold bias generator 47, an analog-to-digital converter 49, a holding register 51, and a telemetry and command system 53.

The output from the photodetector is connected to the input of the amplifier and filter 33. The output from the amplifier and filter 33 is connected to one input of the signal comparator 35. The second input to the signal comparator 35 originates at the telemetry system 53. Specifically, an output of the telemetry and command system is connected to the input of the bias command register 45; the output of the bias command register 45 is connected to the threshold bias generator; and the output of the threshold bias generator 47 is connected to the second input of the signal comparator 35.

The output from the signal comparator is connected to: the input of the leading edge trigger generator 37; the input of the trailing edge generator 39; the input of the analog-to-digital converter 49. The output from the leading edge trigger generator 37 is connected to one input of the star entry gate 41. Similarly, the output from the trailing edge trigger generator 39 is connected to one input of the star exit gate 43. The output from the star entry gate 41 is connected to one input of the holding register 51; the output from the star exit gate 43 is connected to a second input of the holding register 51; and the output from the analog-to-digital converter is connected to a third input of the holding register 51. Finally, the output from the holding register 51 is connected to the telemetry and command system 53.

Also illustrated in FIG. 2 is a digital shaft encoder 55 connected to the shaft of the motor 31. The digital shaft encoder 55 generates a digital output signal that represents the angular location of the shaft of the motor 31. Hence, because the shaft is connected to the reticle, the output of the shaft encoder is an indication of the angular location of the reticle's slit 19. The output from the shaft encoder 55 is connected to the second inputs of the star entry gate 41 and the star exit gate 43.

In operation, the reticle 15 is rotated by the motor so that its slit 19 will scan the field of view of the lens. Each time a star enters the slit area light impinges on the photosensitive surface of the photodetector which generates an output signal indicating the presence of the star. This signal is amplified and filtered by the amplifier and filter 33 to form a relatively clear pulse. The signal is compared in the signal comparator 35 with a signal from threshold bias generator 47.

The threshold bias generator 47 generates an output signal determined by the output from the bias command register 45. That is, the voltage level of the output from the threshold bias generator is controlled by command from the bias command register. In turn, the bias command register is under control of operators on the earth through its connection to the space vehicle's telemetry and command system 53. Hence, operators on the earth can control the setting of the output from the threshold bias generator.

As will be understood by those skilled in the art, it is not necessary to view all of the stars in a particular direction to determine the attitude of a space vehicle and, as will be hereinafter described, a minimum of three stars will uniquely determine the vehicle's attitude. Hence, it is desirable to eliminate the effect of many stars contained in the scanning instrument's field of view; the threshold bias generator and the signal comparator perform this function. The signal comparator compares its dual input signals and only generates an output signal when the voltage level of the input from the amplifier and filter is above the voltage level of the input from the threshold bias generator. Since the voltage level of the threshold bias generator is controllable, as heretofore described, a means is provided for controlling the number of stars that are recognized by the system. That is, the voltage level of the output of the threshold bias generator can be set to only allow the comparator to pass signals from those stars which create a photodetector output voltage that is above a level such as to eliminate the majority of stars in the scanning instrument's field of view.

Signals from stars above the threshold value are applied to the leading edge trigger generator 37 and to the trailing edge trigger generator 39. These stars provide signals during the period of time they are in the slit of the reticle. Hence, they create photodetector signals that rise to a voltage value when the leading edge of the slit and the star coincide. The voltage value is maintained until the trailing edge of the slit coincides with the star. Thereafter, the voltage value drops. The leading edge trigger generator 37 generates a pulse for the initial voltage rise and the trailing edge trigger generator generates a pulse for the final voltage drop. These pulses are applied to the star entry and the star exit gates, respectively. The shaft encoder 55 also applies pulses to the star entry and star exit gates. The signals from the encoder represent the angular position of the reticle slit. Hence, the star entry and star exit gates generate output signals when the leading edge of the reticle slit coincides with a star's light. Further, because the shaft encoder applies a location pulse to the gate, the output signals from the star entry and star exit gates represent both the presence and angular location of a star. That is, the outputs of these gates represent when a star entered and when a star left the slit.

FIG. 3 illustrates how star entry and star exit data determine the exact location of a star. FIG. 3 is a line diagram having a plurality of marks located along the line at various angular positions. Each small mark indicates a pulse from either the star entry or the star exit gate with the first of each pair of exemplary marks being from the star entry gate and the second being from the star exit gate. FIG. 3 also has a large mark in between each pair of entry—exit marks representing a star's exact location. In addition, reference marks are illustrated at 0, 90, 180, 270, and 360 degrees.

Moving from left to right in FIG. 3, the first small mark is an entry pulse mark located at 105 degrees. The second small mark is an exit pulse mark located at 115 degrees. Hence, the star is the large mark located directly between the entry and exit pulse marks at 110 degrees. Similarly, star entry marks are located at 210 and 290 degrees and star exit marks are located at 220 and 300 degrees. Hence, the stars are located at 215 and 295 degrees. Therefore, the line diagram of FIG. 3 represents a condition wherein three stars provide signals above the threshold level set by the threshold bias generator.

The output signals from the star entry gate and the star exit gates are stored in the holding register for transmission to the ground via the space vehicle telemetry and command system 53 when convenient.

The analog-to-digital converter 49 converts the peak amplitude of the output from the signal comparator into a digital code. This digital code is representative of the intensity of the detected star and is also stored in the hold register 51 for subsequent transmission to ground while via the telemetry system. As hereinafter described, this information on star intensity may be utilized to exactly identify the stars whose signals are passed by the signal comparator. Hence, the data assists in determining the general attitude of the space vehicle.

As discussed above, the block system illustrated in FIG. 2 permits a determination of the azimuth or angle at which a star is first seen by the scanning instrument and the angle at which the star is last seen. These angles—called the star entry and the star exit angles—permit an exact determination of the angle at which the star was seen. For example, FIG. 3 illustrates a complete revolution of the reticle to where it is assumed that three stars of sufficient magnitude were detected.

Assuming the reticle is moving at a constant speed, stars exist at 110 degrees, 215 degrees, and 295 degrees.

The information illustrated on the line diagram of FIG. 3 can be transformed to a Cartesian coordinate system as illustrated in FIG. 4. In FIG. 4, the Star A is illustrated at 110 degrees; Star B is illustrated at 215 degrees; and Star C is illustrated at 295 degrees. Point O is considered to be the axis of rotation of the reticle. Hence, the stars make angles AOB, BOC, and COA with each other.

Figure 5:
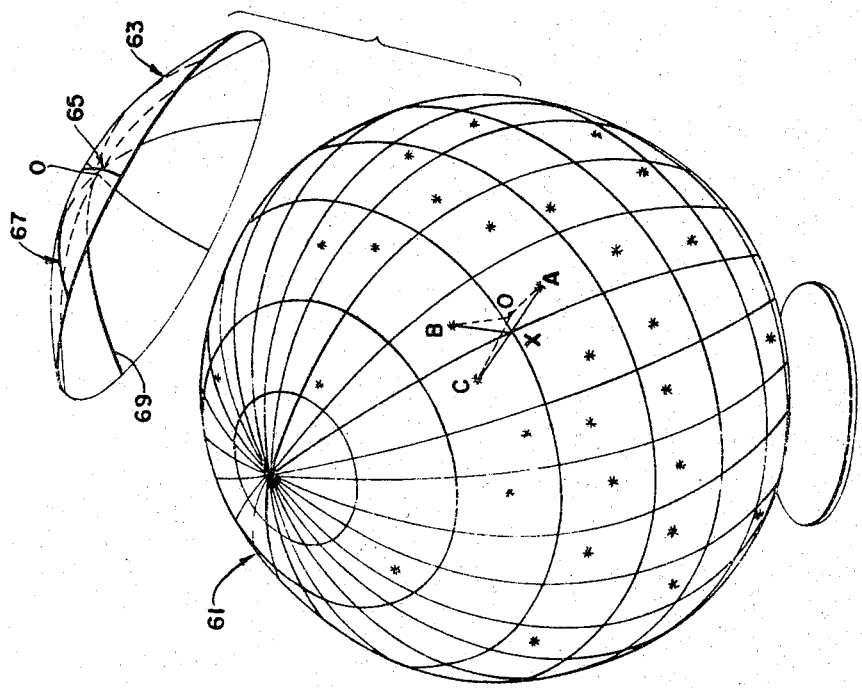
FIG. 5 is a globe and cap-shaped cursor utilized to manually display and establish attitude data.

FIG. 5 illustrates how the attitude of the space vehicle is displayed on a visual display system. The portion of the invention illustrated in FIG. 5 comprises a globe 61 having, as viewed from earth, the exact location of all stars above a certain order or magnitude shown thereon and a semispherical cap-shaped cursor 63 having relatively movable, curved radial arms 65, 67, and 69. The arms extend from a point 0 at the top of the cursor. The curved arms of the cursor can be moved to assume the angles AOB, BOC, and COA. These angles were derived from the data transmitted from the space vehicle in the manner heretofore described. Since the approximate location of the space vehicle can be determined from telescopic or radar observations, the general field of view of the scanning instruments can be guessed. The cup-shaped cursor 63 with its arm forming angles AOB, BOC, and COA is then placed on the globe 61 in the approximate vicinity of the space vehicle. The cap is then moved until each of the arms crosses its respective star as determined by the information from the analog-to-digital converter. It is assumed that the stars A, B, and C illustrated on the globe correspond to the stars A, B, and C illustrated in FIGS. 3 and 4.

As stated above, the analog-to-digital converter 49 generates information regarding the intensities of the stars which are detected by the system. These specific intensities are equated with specific stars in the scanning instrument's field of view and, hence, determine which stars should lie under the cursor's arms. For instance, should the angles between three stars (such as A, B, and C) be such that two orientations of the cursor would be permissible, knowledge of the intensities of three stars makes it possible to select the proper orientation. Hence, while the information from the analog-to-digital converter is not essential to a general operation of the system, it improves the system by eliminating errors when two possible orientations could be predicted for a particular set of information from the star entry and star exit gates.

In addition to determining the attitude of the space vehicle, this system can be used to determine the difference between a desired or proper attitude and an actual attitude. For example, if at the time when the measurements of the angular relations of stars A, B, and C were made, it is assumed that angles AXB, BXC, and CXA shown by the dotted lines on globe 61 are the proper angles for a perfect attitude of the space vehicle, then the difference between the proper attitude and the actual attitude can be determined. Specifically, after the arms of the cursor 63 are set from the transmitted data and the cursor is aligned with the stars A, B, and C, the axis of the scanning instrument will be aligned with point O as illustrated on the globe 63 of FIG. 5. It is the measured distance between the points O and X which provides an accurate indication of the difference between the exact attitude and the desired or proper attitude of the scanning instrument (and, accordingly, of the space vehicle).

Moreover, should the location of a star change as subsequent measurements are made, the space vehicle is rolling. Consequently, a determination of the spin of the space vehicle can be made. Further, since the scanning instrument is fixed to the satellite, the angular position of the satellite can be determined.

In addition, the precession or nutation of the space vehicle can be determined by charting the successive attitudes of the space vehicle as illustrated in FIG. 6. For example, if it is successively determined that the scanning instrument is "looking" first at point 0', then at point 0" and, finally, at point 0''' it is possible to determine that the satellite is precessing about point X. This is because the scanning instrument is fixed to the vehicle. Because it is fixed, its precision indication is idential to that of the space vehicle.

It will be appreciated that the system illustrated in FIG. 2 is suitable for use on a stabilized or earth-oriented space vehicle. That is, because the system is suitable for use on a stabilized space vehicle, it requires a means for rotating the reticle. The system illustrated in FIG. 7 and hereinafter described is suitable for use on a spin-stabilized satellite. That is, because it is mounted along the spin axis of the vehicle it does not require a means for spinning the reticle of the scanning instrument.

In general, the system illustrated in FIG. 7 is similar to that illustrated in FIG. 2 with the elimination of the digital angle-encoder and the substitution of a clock source 71 therefor. Specifically, the system illustrated in FIG. 7 includes a lens 13, a reticle 15 having a slit 19, a photodetector 17, an amplifier and filter 33, a signal comparator 35, leading edge trigger generator 37, a trailing edge trigger generator 39, a star entry gate 41, a star exit gate 43, a bias command register 45, a threshold bias generator 47, an analog-to-digital converter 49, a holding register 51, and a telemetry and command system 53. These foregoing items are all connected together in the same manner as illustrated in FIG. 2. However, because the angle encoder which is connected to the second input of the star entry gate 41 and the star exit gate 43 in FIG. 2 has been eleminated, a means for performing the same function must be provided. The clock 71 performs this function and generates clock pulses which are indicative of the location of the slit 19 of the reticle 15 for any particular period in the rotation cycle. The output from the clock 71 is connected to the second input of the star entry gate and the second input of the star exit gate.

In operation, the system illustrated in FIG. 7 operates similar to the system illustrated in FIG. 2 and generates star entry pulses and star exit pulses from the star entry gate and the star exit gate, respectively. That is, the clock provides information to the star entry gate and star exit gate which indicates the location of the stars generating the pulses. And, the lens, reticle and photodetector indicate the presence of stars. Hence, the outputs from the star entry and the star exit gates are pulses indicating the presence and location stars. This information is held in the holding register until called for by the telemetry system and then telemetered to earth for use in computing the space vehicle's attitude on the globe and cursor system illustrated in FIG. 5 and discusssed above. The analog-to-digital converter again gives information as to the intensity of the stars being observed.

It will be appreciated that the foregoing describes a simple device for determining the location of stars. The location of stars in a scanning instrument filed of view determines the attitude of a space vehicle when properly interpreted by a globe and cursor system or other mechanical means. Alternatively, this information can be suitably programmed into a computer for a computerized determination of the attitude of the space vehicle. In addition, it will be appreciated that this information, when appropirately interpreted, can be utilized to determine the spin of the space vehicle as well as its precession or nutation.

While the foregoing has described the use of a telemetry system for transmitting the detected star information to the earth for proper interpretation, it will be appreciated that this information can also be utilized on the space vehicle. That is, the space vehicle—if it were a man-carrying vehicle—can include a globe and cursor system for use on the vehicle to interpret the star angle information. Or, the space vehicle can have a suitable computer for utilizing this information on board. In the latter case, it is not necessary that the vehicle be manned. It can just as well be on an unmanned vehicle wherein a computer determines its attitude and then compares it with a desired attitude to determine how to move the space vehicle to the desired attitude. This information can also be utilized to eliminate the spin or precession of the space vehicle.

What is claimed:
1. Apparatus for determining the attitude of a space vehicle by detecting the presence and location of stars comprising:
   (a) a light detecting means having a photosensitive surface for generating a signal when light impinges on the photosensitive surface within a field of view;
   (b) an opaque reticle having a transparent viewing slit and rotatable about an axis perpendicular to the plane of the viewing slit;
   (c) a motor having its shaft connected to said reticle for rotating said reticle about its axis of rotation whereby a signal is generated by said light detecting means each time starlight passes through said slit indicating the presence of a star;
   (d) means responsive to the rotation of the reticle for generating a signal corresponding to the angular position of the viewing slit; and
   (e) signal processing means responsive to the signal generated by the light detecting means and the means responsive to the rotation of the reticle for detecting the location of all stars in said field of view having an intensity above a predetermined value and generating output signals indicative of the intensity and location of the stars.

2. Apparatus as claimed in claim 1 wherein said signal processing means comprises:
   a digital shaft encoder having its shaft connected to the shaft of said motor;
   a leading edge trigger generator having its input connected to the output of said light detecting means;
   a trailing edge trigger generator having its input connected to the output of said light detecting means;
   a dual input star entry gate having its inputs connected to the output of said leading edge trigger generator and to the output of said digital shaft encoder; and
   a dual input star exit gate having its inputs connected to the output of said trailing edge trigger generator and to the output of said digital shaft encoder.

3. Apparatus as claimed in claim 2 including:
   means for generating a threshold bias; and
   a signal comparator having one input connected to the output of said photodetector and its second input connected to the output of said threshold bias means and its output connected to the inputs of said leading edge trigger generator and said trailing edge trigger generator.

4. Apparatus as claimed in claim 3 including:
   telemetry means for transmitting and receiving electronic signals; and
   bias command register means for generating an output signal in accordance with its input signal, having its output connected to said threshold bias means and its input connected to said telemetry means.

5. Apparatus as claimed in claim 4 including:
   an analog-to-digital converter having its input connected to the output of said signal comparator;
   a holding register; and
   said holding register having its inputs connected to the output of said star entry gate, said star exit gate, and said analog-to-digital converter and having its output connected to said telemetry means.

6. Apparatus for determining the attitude of a spin stabilized space vehicle by detecting the presence and location of stars comprising:
   (a) a light detecting means having a photosensitive surface for generating a signal when light impinges on the photosensitive surface within a field of view;
   (b) an opaque reticle having a transparent viewing slit, said reticle being affixed to the space vehicle along its spin axis whereby the uniform spin rate of the space vehicle provides a constant spinning rate for the reticle;
(c) a clock source; and
(d) signal processing means responsive to the generated signal and the clock source for detecting the location of all stars in said field of view having an intensity above a predetermined value and generating output signals indicative of the intensity and location of the stars.

7. Apparatus as claimed in claim 6 wherein said signal processing means includes:
a leading edge trigger generator having its input connected to the output of said light detecting means;
a trailing edge trigger generator having its input connected to the output of said light detecting means;
a dual input star entry gate having its inputs connected to the output of said leading edge trigger generator and to the output of said clock source; and
a dual input star exit gate having its inputs connected to an output of said trailing edge trigger generator and said clock source.

8. Apparatus as claimed in claim 7 including:
threshold bias means for generating a threshold bias voltage; and
a signal comparator having one input connected to the output of said light detecting means and a second input connected to the output of said threshold bias means and having its output connected to the inputs of said leading edge trigger generator and said trailing edge trigger generator.

9. Apparatus as claimed in claim 8 including:
telemetry means for transmitting and receiving electronic signals;
bias command register means for generating an output signal in accordance with its input information; and
said bias command register having its output connected to said threshold bias means and its input connected to the output of said telemetry means.

10. Apparatus as claimed in claim 9 including:
an analog-to-digital converter having its input connected to the output of said signal comparator; and
a holding register having its inputs connected to the output of said star entry gate, said star exit gate, and said analog-to-digital converter and having its output connected to said telemetry means.

References Cited
UNITED STATES PATENTS

| | | | |
|---|---|---|---|
| 3,080,485 | 3/1963 | Saxton | 250—203 |
| 3,120,578 | 2/1964 | Potter et al. | 250—203 X |
| 3,127,516 | 3/1964 | Ammerman et al. | 250—203 |
| 3,194,966 | 7/1965 | Hulett | 250—203 |
| 3,243,897 | 4/1966 | West | 35—46 |
| 3,290,933 | 12/1966 | Lillestrand et al. | 250—237 X |

JAMES W. LAWRENCE, Primary Examiner

V. LAFRANCHI, Assistant Examiner

U.S. Cl. X.R.

33—61; 35—47; 244—1, 3.18; 340—190